United States Patent
Hall

(12) 
(10) Patent No.: US 6,737,883 B2
(45) Date of Patent: May 18, 2004

(54) TRANSMISSION MODE SIGNALING WITH A SLOT

(75) Inventor: Stephen H. Hall, Timber, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/015,712

(22) Filed: Dec. 17, 2001

(65) Prior Publication Data
US 2003/0112030 A1 Jun. 19, 2003

(51) Int. Cl.[7] .......................... H03K 19/003; H01P 3/08
(52) U.S. Cl. ............................. 326/26; 326/30; 333/246
(58) Field of Search ............................. 326/21, 26, 30; 333/24 R, 246

(56) References Cited

U.S. PATENT DOCUMENTS 3,771,075 A * 11/1973 Phelan ........................ 333/246
4,027,253 A * 5/1977 Chiron et al. ................ 333/1.1
4,613,834 A * 9/1986 Heine ......................... 333/120
5,970,393 A * 10/1999 Khorrami et al. .............. 455/66
6,133,795 A * 10/2000 Williams ....................... 331/9

* cited by examiner

Primary Examiner—James H. Cho
(74) Attorney, Agent, or Firm—Fish & Richardson P.C.

(57) ABSTRACT

An apparatus includes a substrate, a ground plane on the substrate, the ground plane having a slot, transmission lines lying over the slot, and data processing agents each connected to one of the transmission lines. A method includes inducing a transient return current on a reference plane in response to a driving agent sourcing a current being representative of binary data onto a first transmission line, the current being representative of binary data, propagating energy of the transient return current to a slot in the reference plane, inducing a transient voltage pulse onto a second transmission line connected to a receiving agent when the propagating energy encounters the second transmission line and generating a binary digital signal in the receiving agent from the transient voltage pulse received on the second transmission line.

18 Claims, 4 Drawing Sheets

TRANSMISSION MODE SIGNALING WITH A SLOT

TECHNICAL FIELD

This invention relates to transmission mode signaling.

BACKGROUND

Traditional multi-drop buses, such as a Front-Side Bus (FSB), on computer systems with more than one processor, have a practical maximum speed limit imposed by the electrical connections between the main bus and intermediate devices connected to the main bus.

DETAILED DESCRIPTION

Figure 1:
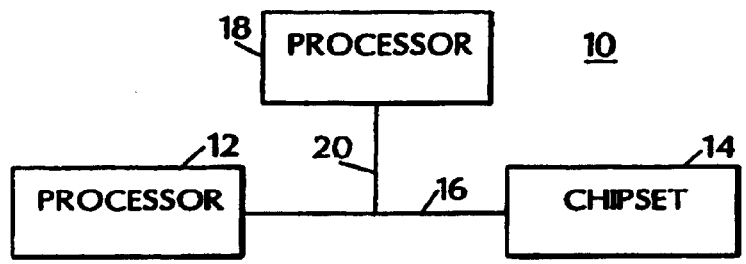
FIG. 1 is a block diagram.

FIG. 1 shows a dual processor Front-Side Bus (FSB) 10. The FSB 10 includes a main driving processor (or main driving agent) 12 connected to a chipset 14 through a main bus trunk 16. The FSB 10 also includes a processor 18, also referred to as an intermediate device (or intermediate agent). The processor 18 is joined to the main bus trunk 16 via a link referred to as a stub 20. Although only one stub is shown as an example, most FSBs contain multiple stubs connecting multiple agents. In the dual-processor FSB 10, the length of stubs employed to layout a practical motherboard limit a maximum bus transfer rate to approximately 600 Mega Transfers per Second (MT/s). The maximum speed of the FSB 10 will decrease with increased loads. For example, it is estimated that a four processor FSB will have a maximum practical speed of approximately 400 MT/s.

The limit on speed of the FSB 10 is caused by reflections at the stubs. These reflections cause decreased timing uncertainty that directly limits the maximum bus speed. A first reflection, for example, occurs at a junction between the main bus trunk 16 and the stub 20. The magnitude of the reflection ($\rho_{junction}$), assuming processor 12 is driving the main bus trunk 16, is close to 33% and is shown by the following equation:

$$\rho_{junction} = \frac{Zo_{main\ bus\ trunk} \| Zo_{stub} - Zo_{main\ bus\ trunk}}{Zo_{main\ bus\ trunk} \| Zo_{stub} + Zo_{main\ bus\ trunk}}$$

where $Zo_{main\ bus\ trunk}$ represents the impedance of the main bus trunk 16 and $Zo_{stub}$ represents the impedance of the stub 16.

If the driver impedance, i.e., processor 12, is not perfectly matched to an impedance of the main bus trunk 16, a portion of the signal reflected at the junction between the main bus trunk 16 and the stub 20 will be re-reflected and bounce back and forth on the main bus trunk 16, which increases inter-symbol interference (ISI) and degrades the timings, which in turn limits the bus speed. For most FSBs, such as FSB 10, the driver (e.g., processor 12) is not matched to the transmission line (e.g., main bus trunk 16) due to the nature of Gunning Transistor Logic (GTL) output drivers.

A signal sent from processor 12 and arriving at the chipset 14 may be distorted due to the presence of the stub 20. The amount of the signal transmitted through the junction between the main bus trunk 16 and the chipset 14 is shown by the following equation:

$$T_{transmit} = 1 + \rho_{junction}$$

This will cause a ledge in a corresponding waveform seen at the chipset 14 with a value of $T_{transmit} * V_{initial}$. The ledge in the waveform will have a duration equal to approximately twice the electrical delay of the stub 20 (i.e., 2*stub delay). This distorted signal degrades the timings and subsequently limits the speed of a multi-drop bus such as FSB 10. If the chipset 14 is not perfectly terminated to the impedance of subsequent reflections, timings will be further degraded by increasing the ISI.

Figure 2:
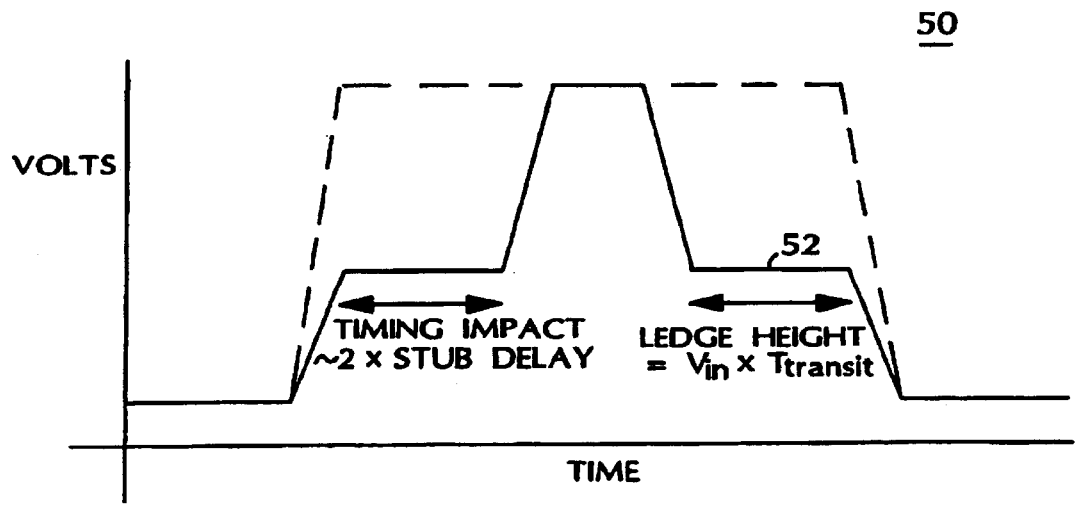
FIG. 2 shows a waveform distortion.

Referring to FIG. 2, a waveform 50 depicts a distortion seen at the chipset 14 assuming perfect termination of the main bus trunk 16. The timing impact of the ledge 52 is large enough to prevent operation of dual processor (or more) computer systems above 400–600 MT/s.

In addition, overshoot at processor 18 is usually relatively high. This causes gate oxide breakdowns, which can violate quality and reliability requirements.

Figure 3:
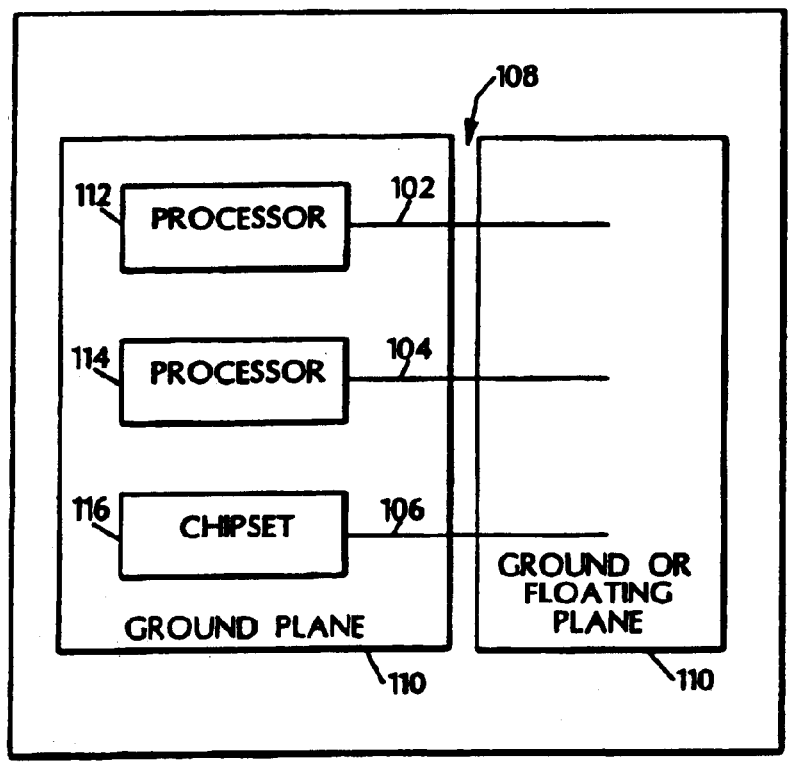
FIG. 3 is a block diagram.

FIG. 3 shows a multi-drop transmission mode signaling bus 100. The bus 100 transfers energy from one transmission mode to another transmission mode. This decreases signal quality impacts associated with stubs, such as stub 20 in FIG. 1, when using direct electrical connections.

The bus 100 includes a series of transmission lines (also referred to microstrip lines) 102, 104 and 106 that pass over a slot 108 in a reference (ground or floating) plane 110. The transmission lines 102, 104 and 106 route signals, respectively, from processor 112, 114 and 116 to locations over the slot 108. When properly excited, the slot 108 functions as a transmission line (referred to as a slotline), i.e., the slot 108 functions as a main bus trunk. The processors 112, 114 and 116, also referred to as agents, communicate with each other by transferring energy from a microstrip (or stripline) transmission mode, i.e.; a mode in which signals can travel in the transmission lines, to a slotline transmission mode, i.e., a mode in which signals traveling in the slot 108, and vice versa.

Figure 4:
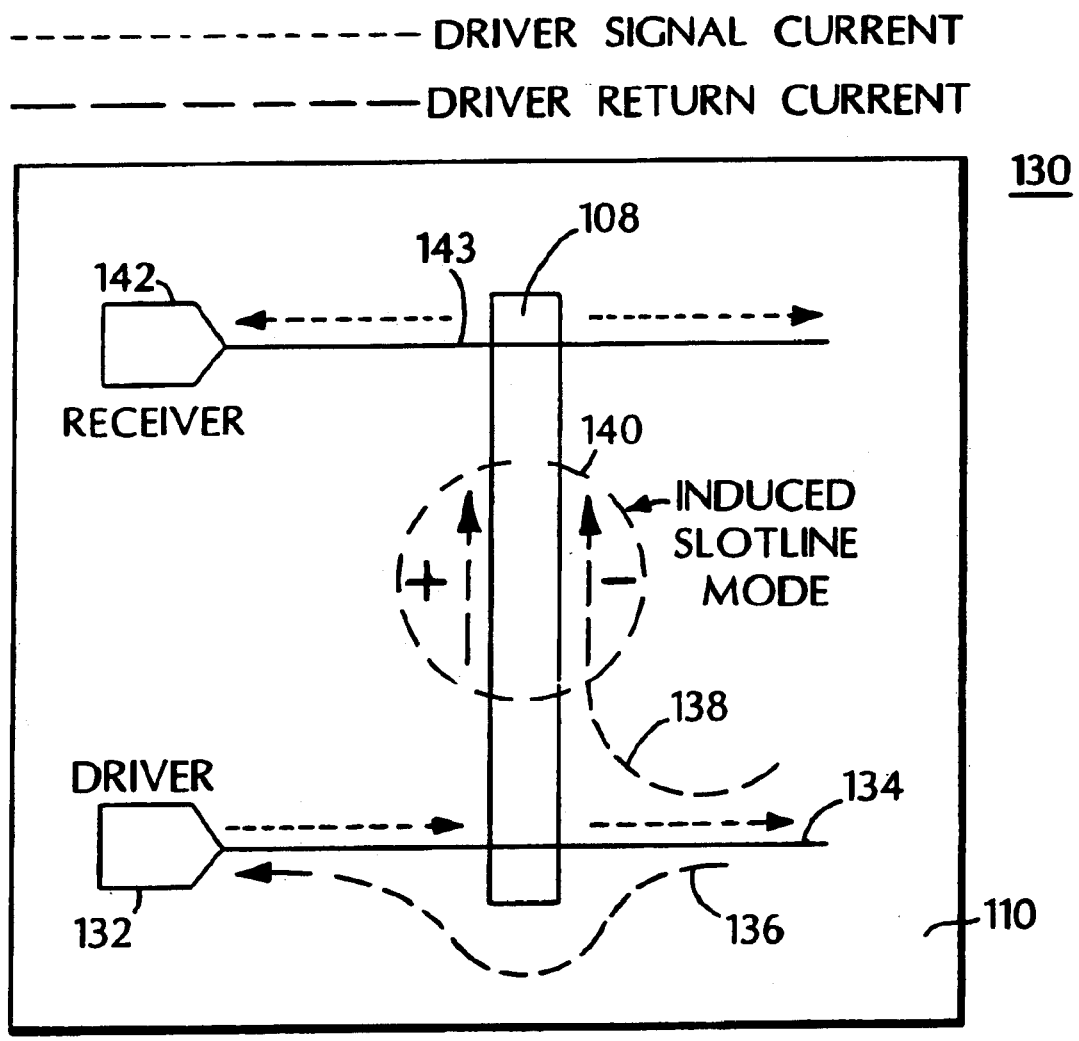
FIG. 4 shows a governing mechanism.

FIG. 4 shows a mechanism 130 governing a transfer of energy from the transmission lines 102, 104 and 106 (microstrip mode) to the slot 108 (slotline mode). When the driving agent 132 (e.g., processor 12) sources a current onto the driving line 134 (e.g., transmission line 102,104 or 106), a transient return current 136 is induced on the reference plane 110. Ideally; the transient return current 136 travels directly below the microstrip transmission line 134. However, when the transient return current 136 encounters the slot 108 in the reference plane 110, it will take a path 138 of least impedance and flow around the slot 108. This transfers the energy from the microstrip transmission mode, i.e., from transmission line 134, to the slotline transmission mode, i.e., to slot 108.

A transient voltage differential 140 is induced across the slot 108. The magnitude of the voltage differential 140 is proportional to the initial driving current and the slot impedance. The slot impedance is a function of the slot width and the distance to any other planes that may exist below the slot 108. The voltage differential 140 induces an electric field across the slot 108. The electrical field propagates down the slot 108 in a manner similar to a FSB transmission line, such as main bus trunk 16 of FIG. 1. When the electrical signal reaches other transmission (microstrip) lines routed over the slot 108, such as transmission line 104 or transmission line 106, a transient voltage is induced onto the transmission (microstrip) line that is equal to the voltage differential 140 across the slot 108. A voltage pulse travels to a receiver 142 on the transmission line 143 where it is reconstructed into a binary digit signal. The voltage pulses are used to transmit high-speed digital signals between agents 112, 114 and 116 on the multi-drop bus 100 at significantly higher data rates than with a front-side bus such as FSB 10.

Figure 5:
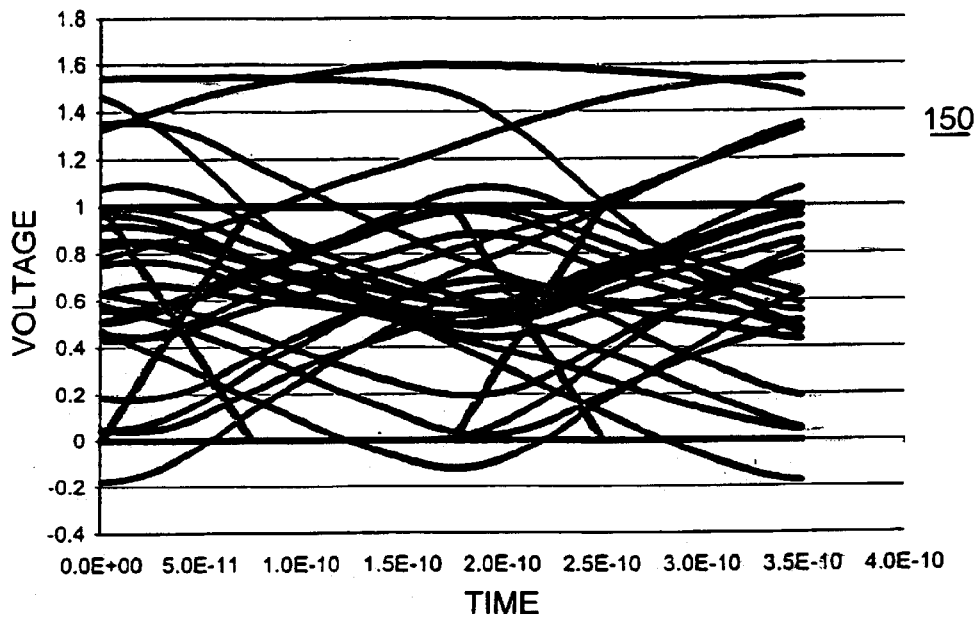
FIG. 5 shows an eye diagram.

FIG. 5 shows an eye diagram 150 produced from a SPICE simulation of a three agent FSB similar to the FSB 10 of FIG. 1. SPICE is a software tool used for simulating circuits and systems at multiple levels of abstraction. SPICE permits a user to simulate analog, digital, and even non-electronic designs from the circuit level through the system level in a single simulator. The eye diagram of the SPICE simulation is compared to an idealized eye diagram at a data rate of 6 GT/s. As seen in FIG. 5, signal integrity is such that there is no eye opening. An eye opening is used to determine the maximum speed that the bus can operate. Wide eye openings allow a designer to increase the transfer rate represented by the eye.

Figure 6:
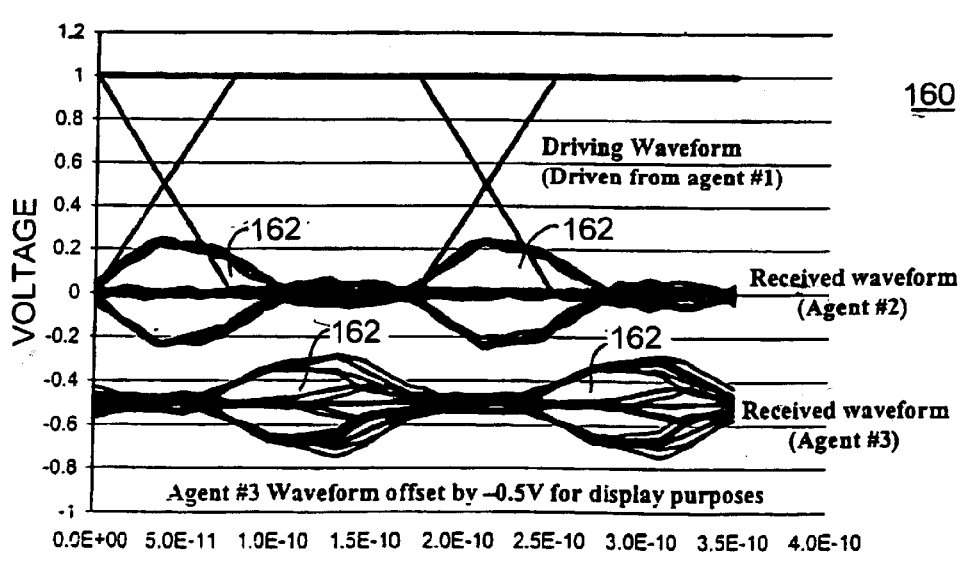
FIG. 6 shows another eye diagram.

FIG. 6 shows an eye diagram 160 of the transmission mode signaling bus 100 of FIG. 3. The eye diagram 160 is at a data rate ten times the predicted practical speed limit of traditional multi-drop buses, such as FSB 10 of FIG. 1. The received pulses are clean and relatively easy to sample. It should be noted that the received pulses are degraded by approximately 14 dB; however, this attenuated signal level does not limit the practicality of the arrangement because the level is not close to the sensitivity limit of modern receiver circuitry.

The eye openings 162 of the received signals may be significantly better with lower rates. This illustrative data rate was chosen because it represents an order of magnitude improvement over traditional multi-drop signaling, as in FSB 10.

Figure 7:
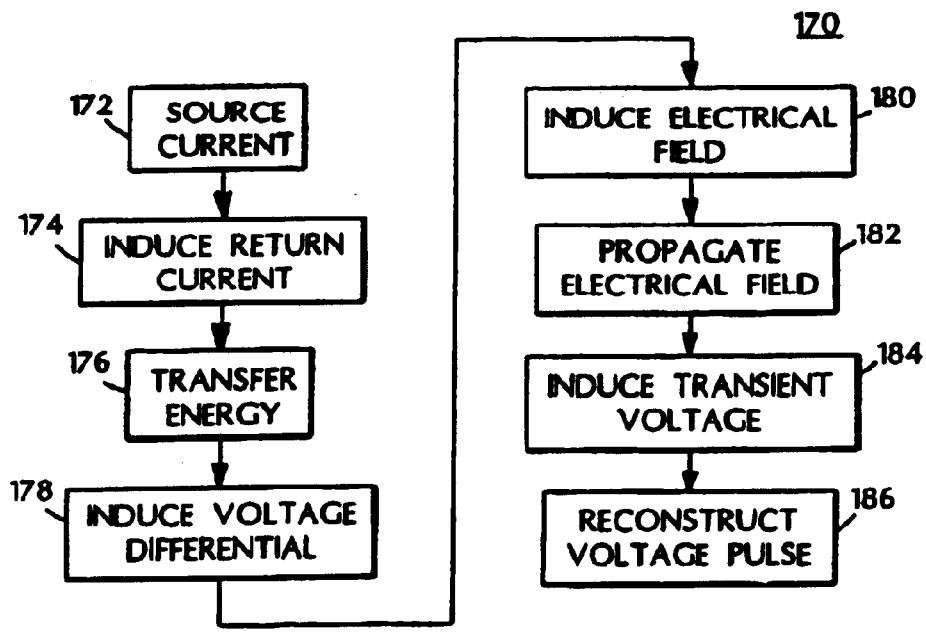
FIG. 7 is a flowchart.

Referring to FIG. 7, a governing process 170 for a transfer of energy from a transmission line (microstrip mode) to a slot (slotline mode) in a transmission mode signaling bus 100 includes sourcing (172) a current onto a driving transmission line and inducing (174) a transient return current on a reference plane. The process 170 transfers (176) energy from the transmission line (microstrip transmission mode) to the slot (slotline transmission mode) when the return current encounters the slot in the reference plane. The process 170 induces (178) a transient voltage differential across the slot and induces (180) an electric field across the slot. The process 170 propagates (182) the electric field down the slot in the reference plane until encountering a transmission line (microstrip) routed over the slot. Upon encountering the transmission line (microstrip), the process 170 induces (184) a transient voltage onto the transmission line that is equal to the voltage differential across the slot. The process 170 reconstructs (186) a voltage pulse at a receiver into a binary digit signal.

Other implementations are within the scope of the following claims.

What is claimed is:

1. An apparatus comprising:
   a substrate;
   a ground plane on the substrate, the ground plane having a slot;
   transmission lines lying over the slot; and
   data processing agents each connected to one of the transmission lines configured such that a first data processing agent sources a current onto a first transmission line connected to the first data processing agent, inducing a transient return current on the ground plane, propagating energy of the transient return current to the slot, inducing a transient voltage pulse onto a second transmission line connected to a second data processing agent when the propagating energy encounters the second transmission line, and generating a binary digital signal in the second data processing agent from the transient voltage pulse received on the second transmission line.

2. The apparatus of claim 1 in which the slot is terminated.

3. The apparatus of claim 1 in which the transmission lines are terminated.

4. The apparatus of claim 1 in which the slot functions as a main bus trunk when excited.

5. The apparatus of claim 1 in which the data processing agents comprise processors.

6. The apparatus of claim 1 in which the data processing agents comprise chipsets.

7. The apparatus of claim 1 in which the transmission lines lie perpendicular to the slot.

8. The apparatus of claim 1 in which the data processing agents comprise signaling circuitry.

9. A method comprising:
   inducing a transient return current on a reference plane in response to a driving agent sourcing a current onto a first transmission line, the current being representative of binary data;
   propagating energy of the transient return current to a slot in the reference plane;
   inducing a transient voltage pulse onto a second transmission line connected to a receiving agent when the propagating energy encounters the second transmission line; and
   generating a binary digital signal in the receiving agent from the transient voltage pulse received on the second transmission line.

10. A method comprising:
    in a bus, sourcing a current being representative of binary data on to a first line;
    inducing a return current on a reference plane;
    transferring energy of the return current to a slot in the reference plane;
    inducing a voltage pulse on to a second transmission line from the energy in the slot; and
    generating a binary digital signal in a receiving agent from the voltage pulse.

11. The method of claim 10 in which the receiving agent is a processor.

12. An apparatus comprising:
    a substrate;
    a ground plane on the substrate, the ground plane having a slot;
    parallel arranged transmission lines lying over the slot; and
    data processing agents each connected to one of the parallel arranged transmission lines configured such that a first data processing agent sources a current onto a first transmission line connected to the first data processing agent, inducing a transient return current on the ground plane, propagating energy of the transient return current to the slot, inducing a transient voltage pulse onto a second transmission line connected to a second data processing agent when the propagating energy encounters the second transmission line, and generating a binary digital signal in the second data processing agent from the transient voltage pulse received on the second transmission line.

13. The apparatus of claim 12 in which the slot is terminated.

14. The apparatus of claim 12 in which the parallel transmission lines are terminated.

15. The apparatus of claim 12 in which the slot functions as a main bus trunk when excited.

16. The apparatus of claim 12 in which the data processing agents comprise processors.

17. The apparatus of claim 12 in which the data processing agents comprise chipsets.

18. The apparatus of claim 12 in which the data processing agents comprise signaling circuitry.

* * * * *